(12) United States Patent
Sensui (10) Patent No.: US 6,421,189 B1
(45) Date of Patent: Jul. 16, 2002

(54) TELEPHOTO LENS SYSTEM (75) Inventor: Takayuki Sensui, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/495,904

(22) Filed: Feb. 2, 2000

(30) Foreign Application Priority Data

Feb. 4, 1999 (JP) ............................................. 11-027886

(51) Int. Cl.$^7$ ............................................. G02B 13/02
(52) U.S. Cl. ............................................. 359/746
(58) Field of Search .................... 359/745, 746, 359/747, 748

(56) References Cited

U.S. PATENT DOCUMENTS

| | | | |
|---|---|---|---|
| 4,610,514 A | 9/1986 | Nakamura | 359/746 |
| 4,764,000 A | 8/1988 | Tokumaru | 359/745 |
| 4,852,984 A * | 8/1989 | Takahashi et al. | 359/748 |
| 5,353,162 A | 10/1994 | Ito et al. | 359/692 |
| 5,627,686 A | 5/1997 | Ohshita | 359/745 |

* cited by examiner

Primary Examiner—Scott J Sugarman
(74) Attorney, Agent, or Firm—Greenblum & Bernstein, P.L.C.

(57) ABSTRACT

A telephoto lens system including a positive first lens group, a negative second lens group, and a positive third lens group, in this order from the object; and focusing is performed by moving the second lens group along the optical axis. The telephoto lens system satisfies the following conditions:

$$1.0 < f/f1 < 1.4 \quad (1)$$

$$1.0 < |f/f2| < 1.6 \quad (2)$$

wherein
f designates the focal length of the entire lens system;
f1 designates the focal length of the first lens group; and
f2 designates the focal length of the second lens group.

12 Claims, 7 Drawing Sheets

Fig.1

Fig.2A $F_{NO}=4.1$
——— d Line
- - - - g Line
— — — C Line
-0.2    0.2
SPHERICAL
ABERRATION

CHROMATIC
ABERRATION

Fig.2B $W=10.0°$
-0.02   0.02
LATERAL
CHROMATIC
ABERRATION

Fig.2C $W=10.0°$
— — S
- - M
-0.2    0.2
ASTIGMATISM

Fig.2D $W=10.0°$
-1  (%)  1
DISTORTION

—— d Line
------ g Line
— — C Line

-0.2  0.2
SPHERICAL
ABERRATION

CHROMATIC
ABERRATION

-0.02  0.02
LATERAL
CHROMATIC
ABERRATION

-0.2  0.2
ASTIGMATISM

-1 (%) 1
DISTORTION

—— d Line
------ g Line
– – – C Line

-0.2  0.2
SPHERICAL
ABERRATION

CHROMATIC
ABERRATION

Fig.6B $W=10.0°$

-0.02  0.02
LATERAL
CHROMATIC
ABERRATION

-0.2  0.2
ASTIGMATISM

Fig.6D $W=10.0°$

-1  (%)  1
DISTORTION

Fig. 7

Fig. 8A $F_{NO}=4.1$
— d line
······ g line
--- C line
-0.2   0.2
SPHERICAL
ABERRATION
CHROMATIC
ABERRATION

Fig. 8B

W=10.1°
-0.02   0.02
LATERAL
CHROMATIC
ABERRATION

Fig. 8C

W=10.1°
— S
--- M
-0.2   0.2
ASTIGMATISM

Fig. 8D

W=10.1°
-1  (%)  1
DISTORTION

—— d line
------- g line
– – – C line

-0.2   0.2
SPHERICAL
ABERRATION

CHROMATIC
ABERRATION

-0.02   0.02
LATERAL
CHROMATIC
ABERRATION

-0.2   0.2
ASTIGMATISM

-1 (%) 1
DISTORTION

— d line
---- g line
--- C line

-0.2    0.2
SPHERICAL
ABERRATION

CHROMATIC
ABERRATION

-0.02   0.02
LATERAL
CHROMATIC
ABERRATION

-0.2   0.2
ASTIGMATISM

-1 (%) 1
DISTORTION

Fig. 13

Fig. 14A 
SPHERICAL
ABERRATION
CHROMATIC
ABERRATION

Fig. 14B 
LATERAL
CHROMATIC
ABERRATION

Fig. 14C 
ASTIGMATISM

Fig. 14D 
DISTORTION

TELEPHOTO LENS SYSTEM

BACKGROUND OF THE INVENTION

1. Field of the Invention

The present invention relates to an inner-focusing telephoto lens system.

2. Description of the Related Art

In a conventional inner-focusing telephoto lens system for a medium-format camera (6×7; 6×4.5) with a focal length of about 200 mm (equivalent to a focal length of about 135 mm for the 35 mm camera), despite the F-number being relatively larger (e.g., about F4), a large number of lens element, such as seven lens elements, is required, which is disadvantageous for miniaturization of the lens system and the production costs thereof as well.

SUMMARY OF THE INVENTION

It is an object of the present invention to provide an inner-focusing telephoto lens system which is constituted by a smaller number of lens elements, and which corrects aberrations sufficiently.

In order to achieve the above object, there is provided a telephoto lens system including a positive first lens group, a negative second lens group, and a positive third lens group, in this order from the object; and focusing is performed by moving the second lens group along the optical axis. The telephoto lens system satisfies the following conditions:

$$1.0 < f/f1 < 1.4 \quad (1)$$

$$1.0 < |f/f2| < 1.6 \quad (2)$$

wherein f designates the focal length of the entire lens system;

f1 designates the focal length of the first lens group; and f2 designates the focal length of the second lens group.

In the above-described telephoto lens system, for the purpose of reducing the number of lens elements, the lens system preferably includes six lens elements in total, e.g., the first lens group includes two positive lens elements and a negative lens element, the second lens group includes a cemented sub-lens group having a positive lens element and a negative lens element, and the third lens group includes a positive lens element, in this order from the object. According to this arrangement, conditions (1) and (2) can easily be satisfied, and thereby the correcting of aberrations can suitably be made.

On the other hand, in the above-described telephoto lens system, if an attempt is made to obtain a much shorter camera-to-object distance (hereinafter, a photographing distance), the traveling distance of the second lens group has to be largely increased, since the power of the second lens group, i.e., the focusing lens group, is determined as defined in condition (2). Therefore in order to reduce fluctuations in chromatic aberration due to the movement of the second lens group, it is preferable to correct chromatic aberration within the second lens group. More concretely, for sufficiently correcting chromatic aberration, the second lens group preferably includes a cemented sub-lens group having a positive lens element and a negative lens element. The order of the positive and negative lens elements is not required. Further, the second lens group preferably satisfies the following conditions:

$$|n1-n2| < 0.1 \quad (3)$$

$$0.7 < \{(v1-v2)/(r2 \times f2)\} \times 1000 < 1.1 \quad (4)$$

wherein n1 designates the refractive index of the negative lens element of the cemented sub-lens group;

n2 designates the refractive index of the positive lens element of the cemented sub-lens group;

v1 designates the Abbe number of the negative lens element of the cemented sub-lens group;

v2 designates the Abbe number of the positive lens element of the cemented sub-lens group; and r2 designates the radius of curvature of the cemented surface of the cemented sub-lens group.

The present disclosure relates to subject matter contained in Japanese Patent Application No.Hei-11-27886 (filed on Feb. 4, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

As shown in FIGS. 1, 3, 5, 7, 9, 11 and 13, the telephoto lens system includes a positive first lens group 10, a negative second lens group 20 and a positive third lens group 30, in this order from the object. A diaphragm S is fixed at a position between the first lens group 10 and the second lens group 20. The first and third lens groups remain stationary, while the second lens group 20 is made movable along the optical axis upon focusing.

In the above-described telephoto lens system, in order to correct aberrations, the power of the first lens group 10 is reduced, and that of the second lens group 20 is reduced accordingly. If the power of the second lens group 20 is strong, the back focal distance becomes long, which results in an increase of the entire length of the lens system; or, if the power of the second lens group 20 is strong, the power of the third lens group 30 has to be increased, which is not desirable because the telephoto ratio increases.

Condition (1) is for reducing the power of the first lens group 10.

If the power of the first lens group is reduced to the extent that f/f1 exceeds the lower limit of condition (1), the entire length of the lens system becomes too long.

If the power of the first lens group is increased to the extent that f/f1 exceeds the upper limit of condition (1), the occurrences of aberrations is quite noticeable.

Condition (2) is for reducing the power of the second lens group in accordance with the power of the first lens group.

If the power of the second lens group is reduced to the extent that |f/f2| exceeds the lower limit of condition (2), the traveling distance of the second lens group upon focusing becomes too long, and further, it becomes difficult to make the shortest photographing distance sufficiently shorter.

If the power of the second lens group is increased to the extent that |f/f2| exceeds the upper limit of condition (2), the back focal distance becomes longer, so that the entire length of the lens system is made longer; or, the power of the third lens group 30 has to be increased, so that the occurrences of aberrations is quite noticeable.

A preferable six-lens-element arrangement, as a practical example, is as follows:

(i) the first lens group includes a positive sub-lens group and a negative sub-lens group for the purpose of reducing chromatic aberration; and the positive sub-lens group includes two lens elements in order to correct aberrations;

(ii) the second lens group which is arranged to move upon focusing includes a cemented sub-lens group having a positive lens element and a negative lens element in order to correct chromatic aberration; and (iii) the third lens group, which has the weakest power among those of the three lens groups, includes a positive lens element.

Under the condition that the power of the second lens group, i.e., the focusing lens group, is reduced according to condition (2), if the shortest photographing distance is made shorter, the traveling distance of the second lens group is inevitably increased.

Conditions (3) and (4) are specified to sufficiently correct chromatic aberration in the second lens group constituted by the above described cemented sub-lens group, and to reduce fluctuations in aberrations in the entire lens system even when the traveling distance the second lens group becomes longer.

Condition (3) specifies the difference between the refractive indexes of the two lens elements of the second lens group 20 in order to reduce fluctuations in chromatic aberration.

If |n1−n2| exceeds the upper limit of condition (3), fluctuation in chromatic aberration cannot be reduced sufficiently.

Condition (4) specifies the amount of color correction on the cemented surface of the second lens group in order to reduce fluctuations in chromatic aberration.

If $\{(v1-v2)/(r2 \times f2)\} \times 1000$ exceeds the upper limit of condition (4), the color correction in the second lens group becomes excessive, so that the correcting of chromatic aberration over the entire lens system becomes insufficient (in particular, at an infinity photographing distance).

If $\{(v1-v2)/(r2 \times f2)\} \times 1000$ exceeds the lower limit of condition (4), the color correction in the second lens group becomes insufficient, so that the correcting of chromatic aberration over the entire lens system becomes excessive (in particular, at the shortest photographing distance).

Specific numerical examples will herein be discussed. In the diagrams of chromatic aberration (axial chromatic aberration) represented by spherical aberration, the solid lines and the two types of dotted lines respectively indicate spherical aberration with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables, $F_{NO}$ designates the F-number, f designates the focal length of the entire lens system, W designates the half angle-of-view (°), $f_B$ designates the back focal distance, r designates the radius of curvature, d designates the lens thickness or space between lens surfaces, $N_d$ designates the refractive index with respect to the d-line, and v designates the Abbe number.

[Embodiment 1]

Figure 1:
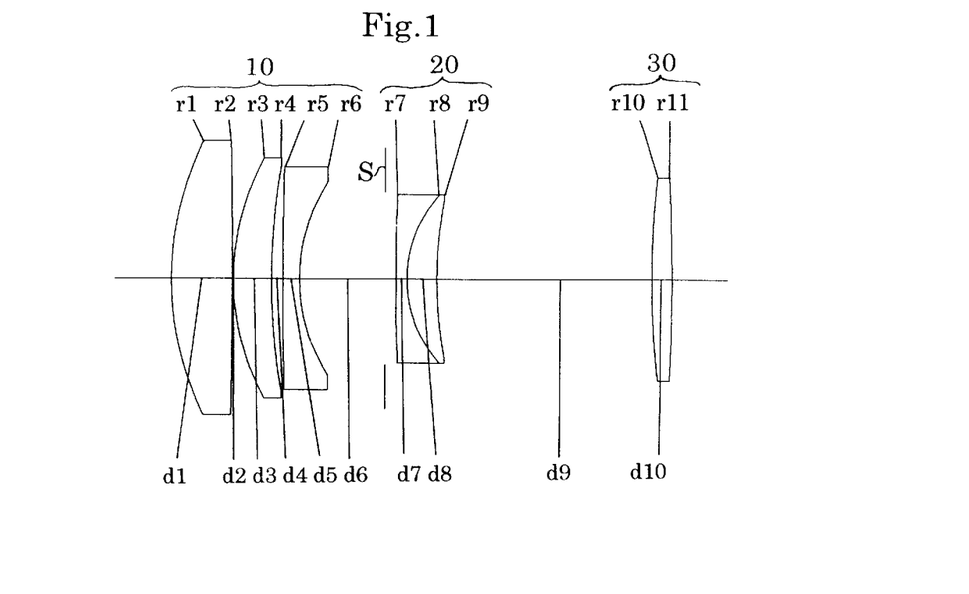
FIG. 1 is a lens arrangement of a first embodiment of a telephoto lens system, according to the present invention.
Figures 2A, 2B:
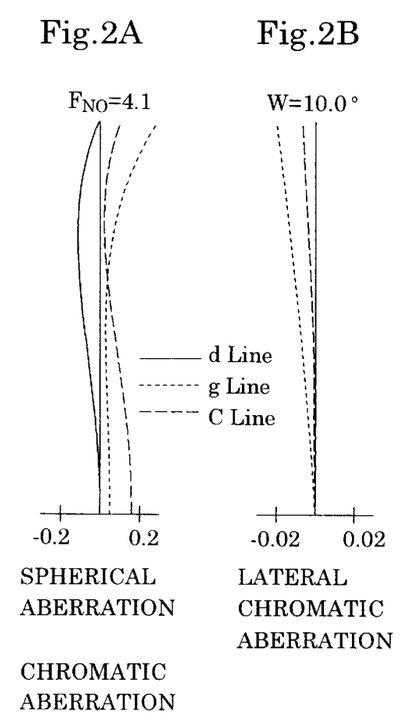
FIGS. 2A, 2B, 2C and 2D are aberration diagrams of the lens arrangement shown in FIG. 1.
Figure 2C:
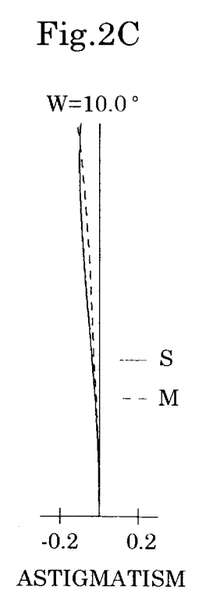
Figure 2D:
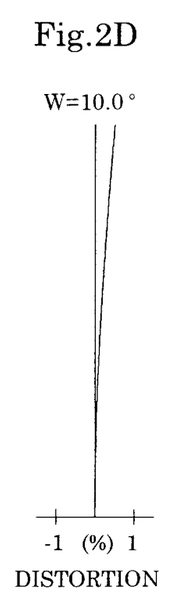

FIG. 1 is a lens arrangement of the first embodiment of a telephoto lens system, and FIGS. 2A, 2B, 2C and 2D are aberration diagrams of the lens arrangement shown in FIG. 1. Table 1 shows the numerical data thereof. Surface Nos. 1 through 6 represent a positive first lens group 10; surface Nos. 7 through 9 represent a negative second lens group 20; and surface Nos. 10 and 11 represent a positive third lens group 30. The first lens group 10 includes a positive lens element, a positive lens element, and a negative lens element, in this order from the object. The second lens group 20 includes a cemented sub-lens group having a negative lens element and a positive lens element, in this order from the object. The third lens group 30 includes a positive lens element.

TABLE 1

$F_{NO} = 1:4.1$
$f = 195.99$
$W = 10.0$
$f_B = 100.28$

| Surface No. | r | d | Nd | v |
|---|---|---|---|---|
| 1 | 55.863 | 10.868 | 1.61800 | 63.4 |
| 2 | −1336.509 | 0.200 | — | — |
| 3 | 44.905 | 6.879 | 1.61800 | 63.4 |
| 4 | 121.091 | 1.991 | — | — |
| 5 | 746.782 | 2.994 | 1.63017 | 36.2 |
| 6 | 32.625 | 15.327 | — | — |
| Diaphragm | ∞ | 2.000 | — | — |
| 7 | 383.088 | 2.000 | 1.71300 | 53.9 |
| 8 | 22.897 | 5.358 | 1.71687 | 46.6 |
| 9 | 77.745 | 38.408 | — | — |
| 10 | 156.708 | 3.690 | 1.63643 | 59.0 |
| 11 | −355.651 | — | — | — |

[Embodiment 2]

Figure 3:
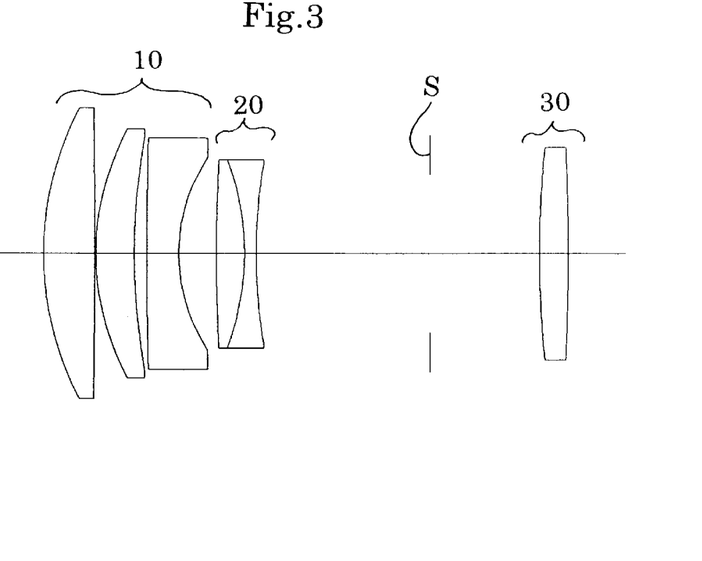
FIG. 3 is a lens arrangement of a second embodiment of the telephoto lens system, according to the present invention.
Figures 4A, 4B:
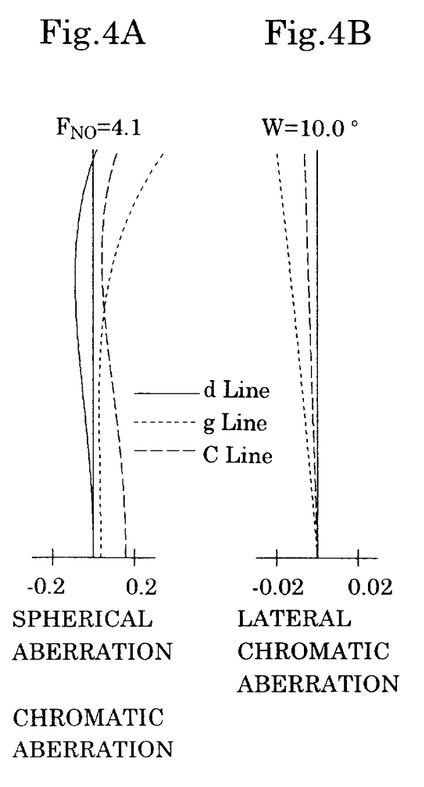
FIGS. 4A, 4B, 4C and 4D are aberration diagrams of the lens arrangement shown in FIG. 3.
Figure 4C:
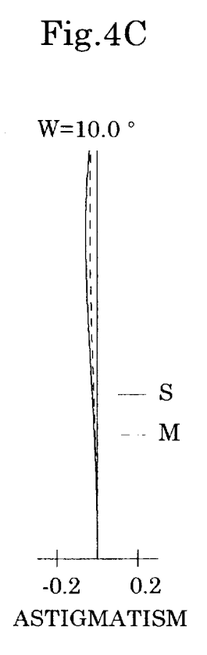
Figure 4D:
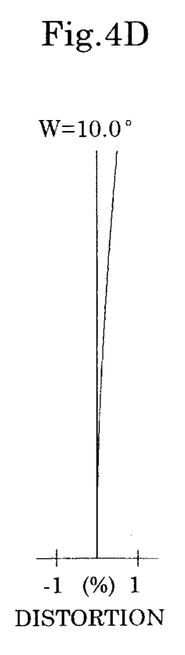

FIG. 3 is a lens arrangement of the second embodiment of the telephoto lens system, according to the present invention, and FIGS. 4A, 4B, 4C and 4D are aberration diagrams of the lens arrangement shown in FIG. 3. Table 2 shows the numerical data thereof. The lens basic lens arrangement is the same as in the first embodiment.

TABLE 2

$F_{NO} = 1:4.1$
$f = 196.00$
$W = 10.0$
$f_B = 98.71$

| Surface No. | r | d | Nd | ν |
|---|---|---|---|---|
| 1 | 54.228 | 8.834 | 1.61800 | 63.4 |
| 2 | −1674.369 | 0.200 | — | — |
| 3 | 45.693 | 6.629 | 1.61800 | 63.4 |
| 4 | 114.813 | 2.169 | — | — |
| 5 | 754.108 | 5.491 | 1.62004 | 36.3 |
| 6 | 31.055 | 6.459 | — | — |
| 7 | 318.607 | 4.844 | 1.72000 | 43.7 |
| 8 | −46.723 | 2.000 | 1.72000 | 50.2 |
| 9 | 95.737 | 30.000 | — | — |
| Diaphragm | ∞ | 18.981 | — | — |
| 10 | 177.960 | 5.000 | 1.57099 | 50.8 |
| 11 | −419.264 | — | — | — |

[Embodiment 3]

Figure 5:
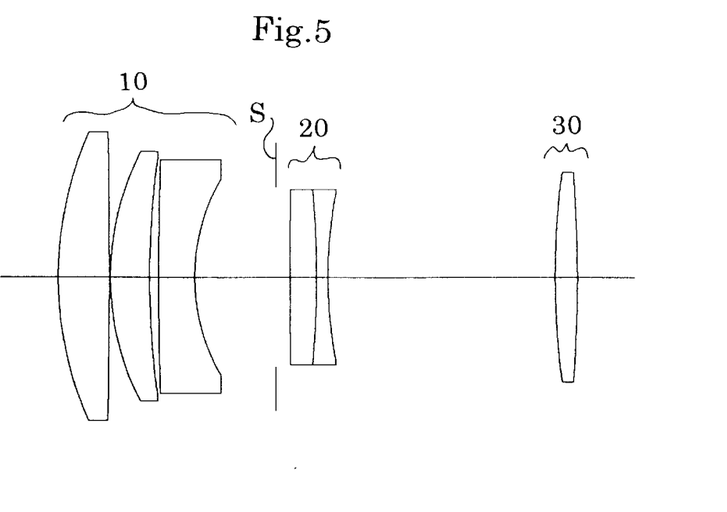
FIG. 5 is a lens diagram of a third embodiment of the telephoto lens system, according to the present invention.
Figures 6A, 6B:
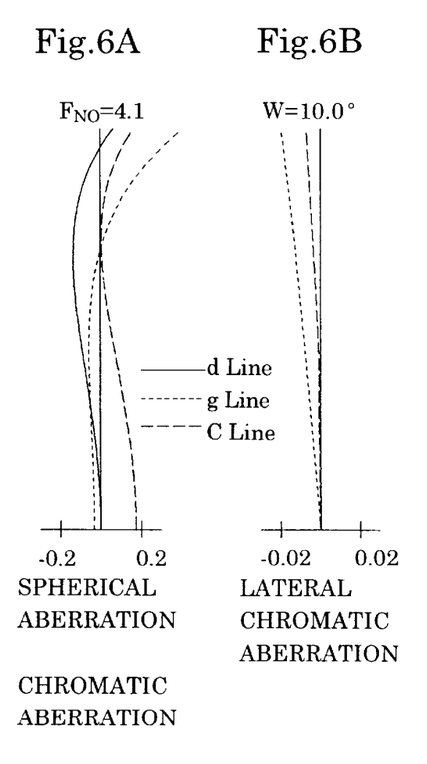
FIGS. 6A, 6B, 6C and 6D are aberration diagrams of the lens arrangement shown in FIG. 5.
Figure 6C:
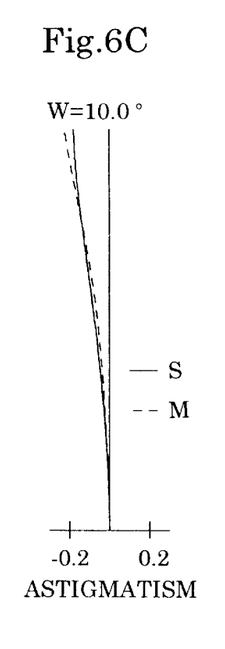
Figure 6D:
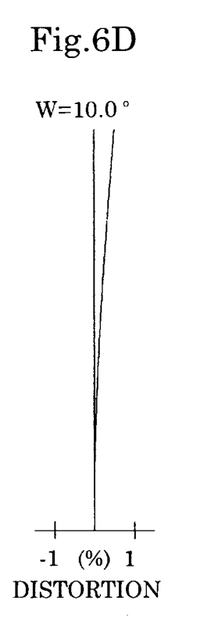

FIG. 5 is a lens diagram of the third embodiment of the telephoto lens system, according to the present invention, and FIGS. 6A, 6B, 6C and 6D are aberration diagrams of the lens arrangement shown in FIG. 5. Table 3 shows the numerical data thereof. The basic lens arrangement is the same as in the first embodiment.

TABLE 3

$F_{NO} = 1:4.1$
$f = 196.00$
$W = 10.0$
$f_B = 98.87$

| Surface No. | r | d | Nd | ν |
|---|---|---|---|---|
| 1 | 62.294 | 8.973 | 1.61800 | 63.4 |
| 2 | −1273.226 | 0.200 | — | — |
| 3 | 47.359 | 6.882 | 1.61800 | 63.4 |
| 4 | 152.181 | 1.586 | — | — |
| 5 | 643.050 | 6.337 | 1.62588 | 35.7 |
| 6 | 34.001 | 14.270 | — | — |
| Diaphragm | ∞ | 2.508 | — | — |
| 7 | 958.298 | 4.686 | 1.80518 | 25.4 |
| 8 | −177.154 | 2.000 | 1.66672 | 48.3 |
| 9 | 76.143 | 39.759 | — | — |
| 10 | 134.386 | 3.930 | 1.48749 | 70.2 |
| 11 | −236.192 | — | — | — |

[Embodiment 4]

Figure 7:
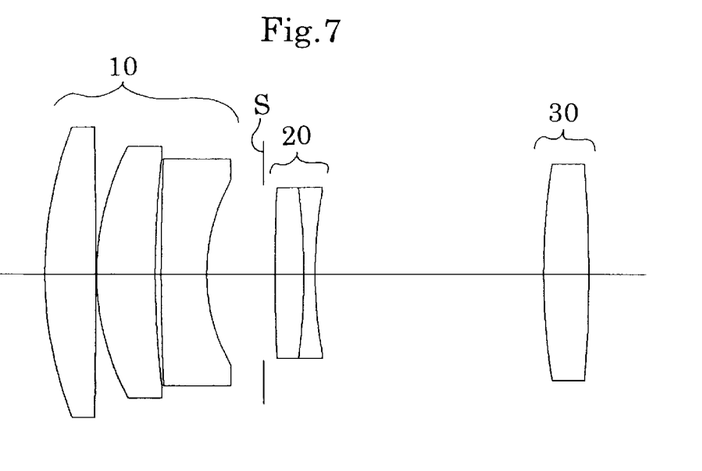
FIG. 7 is a lens diagram of a fourth embodiment of the telephoto lens system, according to the present invention.
Figures 8A, 8B:
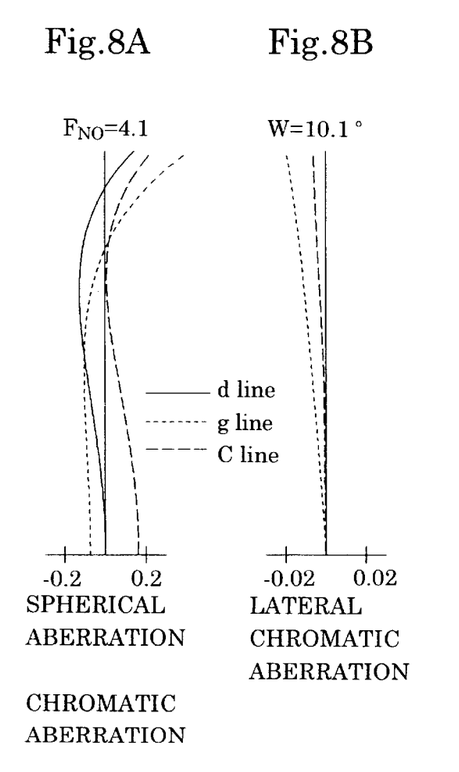
FIGS. 8A, 8B, 8C and 8D are aberration diagrams of the lens arrangement shown in FIG. 7.
Figure 8C:
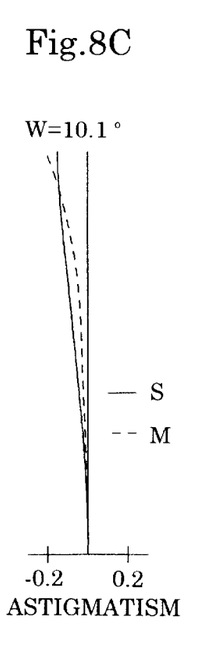
Figure 8D:
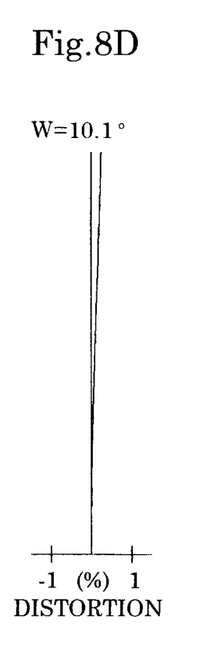

FIG. 7 is a lens diagram of the fourth embodiment of the telephoto lens system, according to the present invention, and FIGS. 8A, 8B, 8C and 8D are aberration diagrams of the lens arrangement shown in FIG. 7. Table 4 shows the numerical data thereof. The basic lens arrangement is the same as in the first embodiment.

TABLE 4

$F_{NO} = 1:4.1$
$f = 196.00$
$W = 10.1$
$f_B = 95.00$

| Surface No. | r | d | Nd | ν |
|---|---|---|---|---|
| 1 | 70.145 | 8.862 | 1.61800 | 63.4 |
| 2 | −2034.433 | 0.200 | — | — |
| 3 | 46.683 | 10.227 | 1.61800 | 63.4 |
| 4 | 173.132 | 1.049 | — | — |
| 5 | 431.908 | 8.000 | 1.64769 | 33.8 |
| 6 | 33.128 | 9.949 | — | — |

TABLE 4-continued $F_{NO} = 1:4.1$
$f = 196.00$
$W = 10.1$
$f_B = 95.00$

| Surface No. | r | d | Nd | ν |
|---|---|---|---|---|
| Diaphragm | ∞ | 2.000 | — | — |
| 7 | 342.632 | 5.000 | 1.80518 | 25.4 |
| 8 | −127.145 | 2.000 | 1.79952 | 42.2 |
| 9 | 82.230 | 39.839 | — | — |
| 10 | 120.700 | 7.874 | 1.48749 | 70.2 |
| 11 | −246.139 | — | — | — |

[Embodiment 5]

Figure 9:
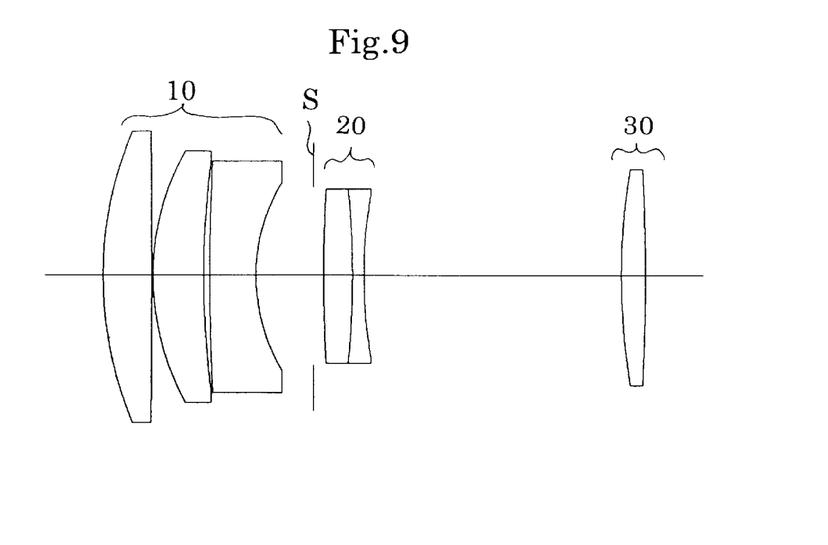
FIG. 9 is lens arrangement of a fifth embodiment of the telephoto lens system, according to the present invention.
Figures 10A, 10B, 10C:
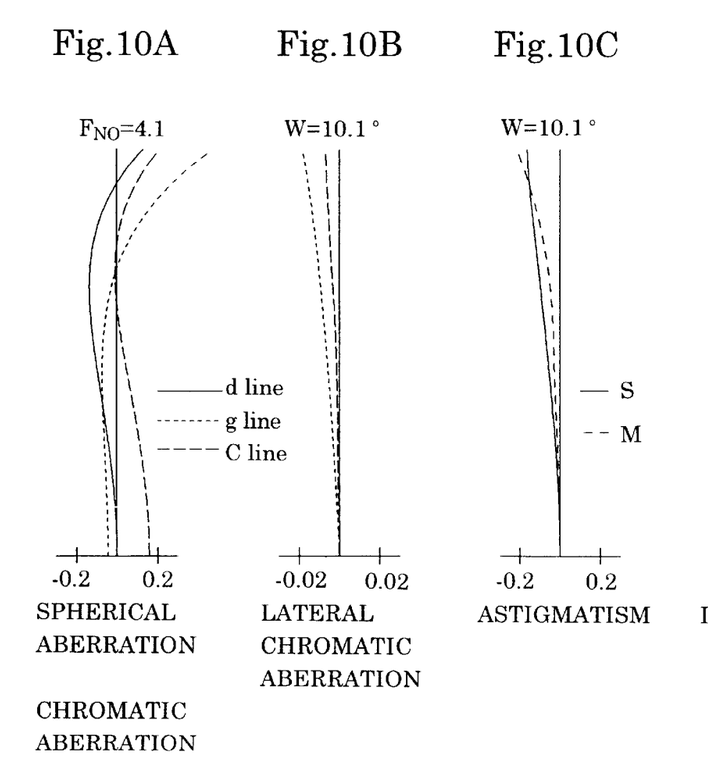
FIGS. 10A, 10B, 10C and 10D are aberration diagrams of the lens arrangement shown in FIG. 9.
Figure 10D:
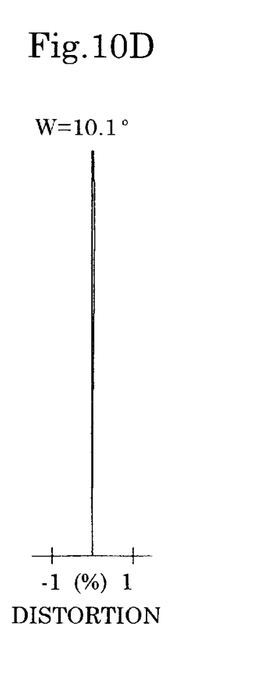

FIG. 9 is lens arrangement of the fifth embodiment of the telephoto lens system, according to the present invention, and FIGS. 10A, 10B, 10C and 10D are aberration diagrams of the lens arrangement shown in FIG. 9. Table 5 shows the numerical data thereof. The basic lens arrangement is the same as in the first embodiment.

TABLE 5

$F_{NO} = 1:4.1$
$f = 196.00$
$W = 10.1$
$f_B = 94.26$

| Surface No. | r | d | Nd | ν |
|---|---|---|---|---|
| 1 | 67.769 | 8.442 | 1.61800 | 63.4 |
| 2 | −2741.576 | 0.200 | — | — |
| 3 | 45.591 | 8.765 | 1.61800 | 63.4 |
| 4 | 154.715 | 1.058 | — | — |
| 5 | 385.375 | 8.000 | 1.63980 | 34.5 |
| 6 | 32.234 | 9.976 | — | — |
| Diaphragm | ∞ | 1.800 | — | — |
| 7 | 289.341 | 5.000 | 1.80518 | 25.4 |
| 8 | −153.729 | 2.000 | 1.79952 | 42.2 |
| 9 | 80.924 | 44.955 | — | — |
| 10 | 115.594 | 4.200 | 1.48749 | 70.2 |
| 11 | −344.851 | — | — | — |

[Embodiment 6]

Figure 11:
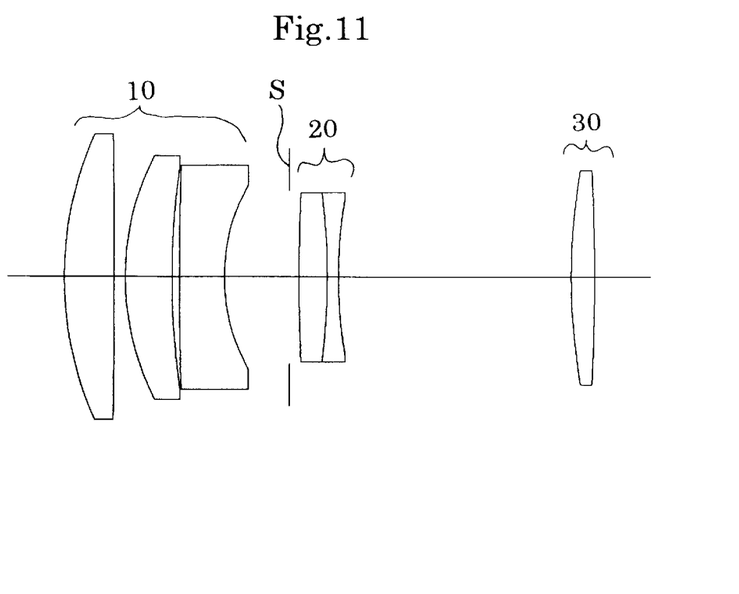
FIG. 11 is a lens arrangement of a sixth embodiment of the telephoto lens system, according to the present invention.
Figure 12A:
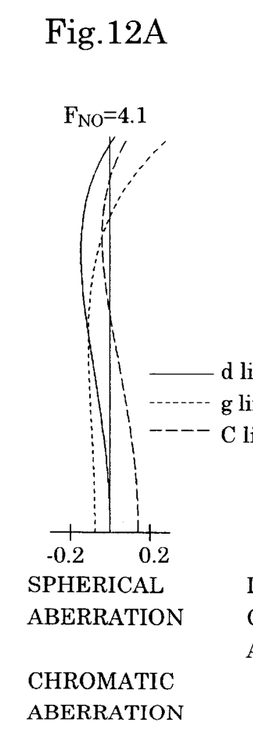
FIGS. 12A, 12B, 12C and 12D are aberration diagrams of the lens arrangement shown in FIG. 11.
Figure 12B:
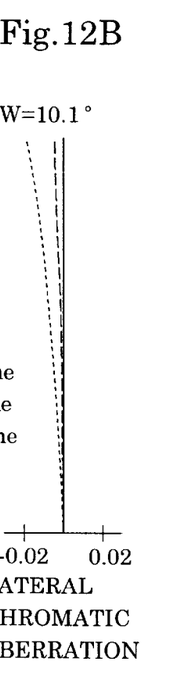
Figure 12C:
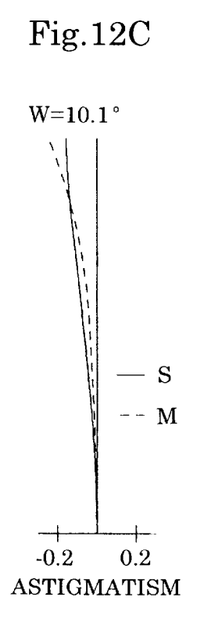
Figure 12D:
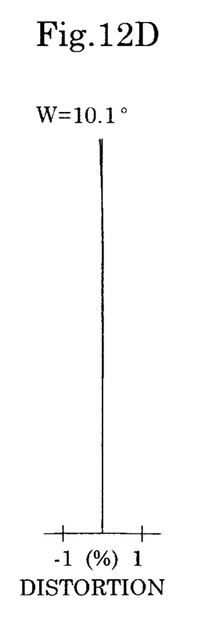

FIG. 11 is a lens arrangement of the sixth embodiment of the telephoto lens system, according to the present invention, and FIGS. 12A, 12B, 12C and 12D are aberration diagrams of the lens arrangement shown in FIG. 11. Table 6 shows the numerical data thereof. The basic lens arrangement is the same as in the first embodiment.

TABLE 6

$F_{NO} 1:4.1$
$t = 196.00$
$W = 10.1$
$f_B = 94.90$

| Surface No. | r | d | Nd | ν |
|---|---|---|---|---|
| 1 | 61.985 | 8.814 | 1.59240 | 68.3 |
| 2 | −2222.678 | 1.988 | — | — |
| 3 | 47.253 | 8.294 | 1.61800 | 63.4 |
| 4 | 145.635 | 1.280 | — | — |
| 5 | 582.939 | 8.000 | 1.62588 | 35.7 |
| 6 | 32.604 | 11.507 | — | — |
| Diaphragm | ∞ | 1.800 | — | — |
| 7 | 358.797 | 5.000 | 1.80518 | 25.4 |
| 8 | −118.166 | 2.000 | 1.76200 | 40.1 |
| 9 | 83.475 | 41.514 | — | — |

TABLE 6-continued $F_{NO}$ 1:4.1
t = 196.00
W = 10.1
$f_B$ = 94.90

| Surface No. | r | d | Nd | ν |
|---|---|---|---|---|
| 10 | 108.373 | 4.200 | 1.48749 | 70.2 |
| 11 | −353.289 | — | — | — |

[Embodiment 7]

Figure 13:
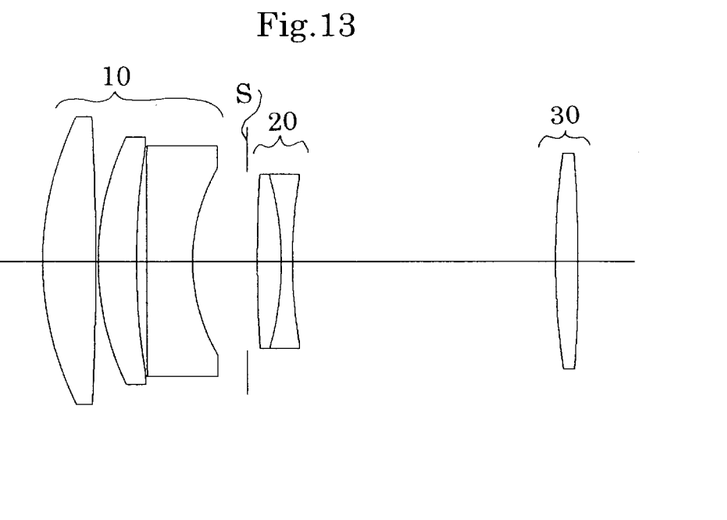
FIG. 13 is a lens arrangement of a seventh embodiment of the telephoto lens system, according to the present invention.
Figures 14A, 14B, 14C:
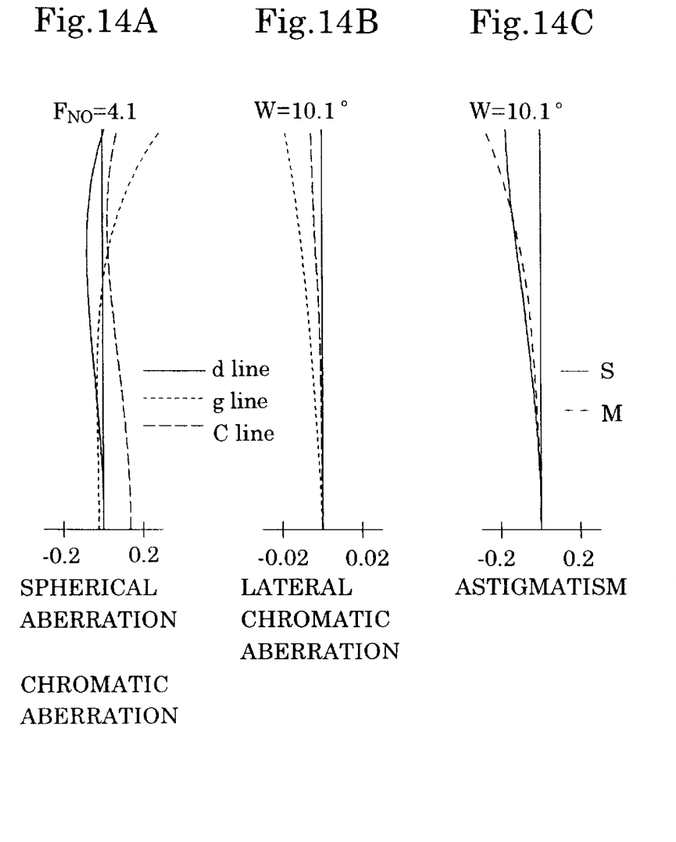
FIGS. 14A, 14B, 14C and 14D are aberration diagrams of the lens arrangement shown in FIG. 13.
Figure 14D:
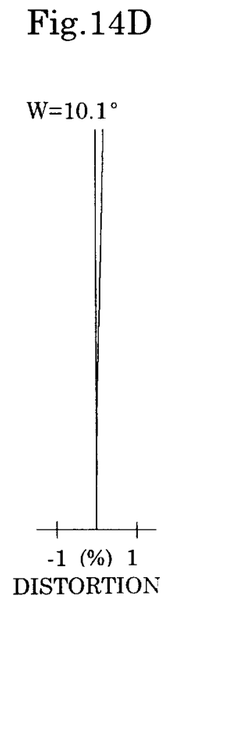

FIG. 13 is a lens arrangement of a seventh embodiment of the telephoto lens system, according to the present invention, and FIGS. 14A, 14B, 14C and 14D are aberration diagrams of the lens arrangement shown in FIG. 13. Table 7 shows the numerical data thereof. The basic lens arrangement is the same as in the first embodiment.

TABLE 7

$F_{NO}$ = 1:4.1
f = 196.00
W = i0.i
$f_B$ = 95.68

| Surface No. | r | d | Nd | ν |
|---|---|---|---|---|
| 1 | 56.489 | 9.357 | 1.56907 | 71.3 |
| 2 | −483.174 | 0.412 | — | — |
| 3 | 49.992 | 6.754 | 1.69680 | 55.5 |
| 4 | 126.977 | 1.826 | — | — |
| 5 | 3565.726 | 8.000 | 1.62588 | 35.7 |
| 6 | 32.642 | 9.605 | — | — |
| Diaphragm | ∞ | 1.800 | — | — |
| 7 | 279.717 | 4.190 | 1.80518 | 25.4 |
| 8 | −58.566 | 2.000 | 1.80610 | 33.3 |
| 9 | 85.700 | 46.338 | — | — |
| 10 | 127.579 | 4.038 | 1.48749 | 70.2 |
| 11 | −274.211 | — | — | — |

Each condition of each embodiment is shown in Table 8.

TABLE 8

| | Cond. (1) | Cond. (2) | Cond. (3) | Cond. (4) |
|---|---|---|---|---|
| Embodiment 1 | 1.24 | 1.39 | 0.004 | — |
| Embodiment 2 | 1.20 | 1.02 | 0.000 | 0.73 |
| Embodiment 3 | 1.27 | 1.39 | — | 0.92 |
| Embodiment 4 | 1.24 | 1.42 | 0.006 | 0.96 |
| Embodiment 5 | 1.27 | 1.36 | 0.006 | 0.76 |
| Embodiment 6 | 1.17 | 1.26 | 0.043 | 0.80 |
| Embodiment 7 | 1.22 | 1.26 | 0.001 | 0.86 |

Each embodiment satisfies conditions (1) and (2). Each embodiment, except for the third embodiment, satisfies condition (3). Moreover, each embodiment, except for the first embodiment, satisfies condition (4). Furthermore, in each embodiment, aberrations are adequately corrected; and in each embodiment, except for the first embodiment, the shortest photographing distance can further be reduced.

According to the above description, an inner-focusing telephoto lens system, which has an F-number of about 4, and is constituted by a smaller number of lens elements, and further, by which aberrations are adequately corrected, can be obtained.

What is claimed is:

1. A telephoto lens system comprising a positive first lens group, a negative second lens group, and a positive third lens group, in this order from an object, wherein focusing is performed by moving said second lens group along the optical axis while the first and third lens groups are stationary;

wherein said first lens group consists of a positive lens element, a positive lens element and a negative lens element, in this order from the object; and wherein said telephoto lens system satisfies the following conditions:

$$1.0 < f/f1 < 1.4$$

$$1.0 < |f/f2| < 1.6$$

wherein f designates the focal length of the entire lens system;

f1 designates the focal length of said first lens group; and f2 designates the focal length of said second lens group.

2. The telephoto lens system according to claim 1, wherein said second lens group comprises a cemented sub-lens group having a positive lens element and a negative lens element, and said third lens group comprises a positive lens element, in this order from the object.

3. The telephoto lens system according to claim 2, wherein said telephoto lens system satisfies the following conditions:

$$|n1-n2| < 0.1$$

$$0.7 < \{(v1-v2)/(r2 \times f2)\} \times 1000 < 1.1$$

wherein n1 designates the refractive index of said negative lens element of said cemented sub-lens group of said second lens group of;

n2 designates the refractive index of said positive lens element of said cemented sub-lens group of said second lens group;

v1 designates the Abbe number of said negative lens element of said cemented sub-lens group of said second lens group;

v2 designates the Abbe number of said positive lens element of said cemented sub-lens group of said second lens group; and r2 designates the radius of curvature of the cemented surface of said cemented sub-lens group of said second lens group.

4. A telephoto lens system comprising a positive first lens group, a negative second lens group, and a positive third lens group, in this order from an object, said first lens group consisting of a positive lens element, a positive lens element and a negative lens element, said second lens group comprisisng a cemented sub-lens group having a positive lens element and a negative lens element, and said third lens group comprising a positive lens element, in this order from said object;

wherein focusing is performed by moving said second lens group along an optical axis; and wherein said telephoto lens system satisfies the following conditions:

$$1.0 < f/f1 < 1.4$$

$$1.0 < |f/f2| < 1.6$$

wherein f designates the focal length of the entire lens system;

f1 designates the focal length of said first lens group; and f2 designates the focal length of said second lens group.

5. A telephoto lens system comprising a positive first lens group, a negative second lens group, and a positive third lens group, in this order from an object, wherein focusing is performed by moving said second lens group along the optical axis;

wherein said second lens group comprises a cemented sub-lens group having a positive lens element and a negative lens element, in this order from said object; and wherein said telephoto lens system satisfies the following conditions:

$$1.0 < f/f1 < 1.4$$

$$1.0 < |f/f2| < 1.6$$

$$|n1 - n2| < 0.1$$

$$0.7 < \{(v1 - v2)/(r2 \times f2)\} \times 1000 < 1.1$$

wherein
f designates the focal length of the entire lens system;
f1 designates the focal length of said first lens group;
f2 designates the focal length of said second lens group;
n1 designates the refractive index of said negative lens element of said cemented sub-lens group of said second lens group;
n2 designates the refractive index of said positive lens element of said cemented sub-lens group of said second lens group;
v1 designates the Abbe number of said negative lens element of said cemented sub-lens group of said second lens group;
v2 designates the Abbe number of said positive lens element of said cemented sub-lens group of said second lens group; and
r2 designates the radius of curvature of the cemented surface of said cemented sub-lens group of said second lens group.

6. A telephoto lens system comprising a positive first lens group, a negative second lens group, and a positive third lens group, in this order from an object, wherein focusing is performed by moving said second lens group along the optical axis while the first and third lens groups are stationary;

wherein said third lens group consists of a positive lens element;

wherein said telephoto lens system satisfies the following conditions:

$$1.0 < f/f1 < 1.4$$

$$1.0 < |f/f2| < 1.6$$

wherein
f designates the focal length of the entire lens system;
f1 designates the focal length of said first lens group; and
f2 designates the focal length of said second lens group.

7. The telephoto lens system according to claim 6, wherein said first lens group comprises a positive lens element, a positive lens element and a negative lens element, and said second lens group comprises a cemented sub-lens group having a positive lens element and a negative lens element in this order from the object.

8. The telephoto lens system according to claim 7, wherein said telephoto lens system satisfies the following conditions:

$$|n1 - n2| < 0.1$$

$$0.7 < \{(v1 - v2)/(r2 \times f2)\} \times 1000 < 1.1$$

wherein
n1 designates the refractive index of said negative lens element of said cemented sub-lens group of said second lens group;
n2 designates the refractive index of said positive lens element of said cemented sub-lens group of said second lens group;
v1 designates the Abbe number of said negative lens element of said cemented sub-lens group of said second lens group
v2 designates the Abbe number of said positive lens element of said cemented sub-lens group of said second lens group; and
r2 designates the radius of curvature of the cemented surface of said cemented sub-lens group of said second lens group.

9. A telephoto lens system comprising a positive first lens group, a negative second lens group, and a positive third lens group, in this order from an object, wherein focusing is performed by moving said second lens group along the optical axis while the first and third lens groups are stationary;

wherein said second lens group comprises a cemented sub-lens group having a positive lens element and a negative lens element; and wherein said telephoto lens system satisfies the following conditions:

$$1.0 < f/f1 < 1.4$$

$$1.0 < |f/f2| < 1.6$$

$$|n1 - n2| < 0.1$$

$$0.7 < \{(v1 - v2)/(r2 \times f2)\} \times 1000 < 1.1$$

wherein
f designates the focal length of the entire lens system;
f1 designates the focal length of said first lens group;
f2 designates the focal length of said second lens group;
n1 designates the refractive index of said negative lens element of said cemented sub-lens group of said second lens group;
n2 designates the refractive index of said positive lens element of said cemented sub-lens group of said second lens group
v1 designates the Abbe number of said negative lens element of said cemented sub-lens group of said second lens group;
v2 designates the Abbe number of said positive lens element of said cemented sub-lens group of said second lens group; and
r2 designates the radius of curvature of the cemented surface of said cemented sub-lens group of said second lens group.

10. The telephoto lens system according to claim 9, wherein the first lens group comprises two positive lens elements and a negative lens element, and said third lens group comprises a positive lens element, in this order from the object.

11. A telephoto lens system comprising a positive first lens group, a negative second lens group, and a positive third lens group, in this order from an object, wherein focusing is performed by moving said second lens group along an optical axis; and wherein said first lens group comprises a positive lens element, a positive lens element and a negative lens element, said second lens group comprises a cemented sub-lens group having a positive lens element and a negative lens element, and said third lens group consists of a positive lens element, in this order from the object;

wherein said telephoto lens system satisfies the following conditions:

$$1.0 < f/f1 < 1.4$$

$$1.0 < |f/f2| < 1.6$$

wherein f designates the focal length of the entire lens system;

f1 designates the focal length of said first lens group; and f2 designates the focal length of said second lens group.

12. A telephoto lens system comprising a positive first lens group, a negative second lens group, and a positive third lens group, in this order from an object, wherein focusing is performed by moving said second lens group along the optical axis;

wherein said first lens group comprises a positive lens element, a positive lens element and a negative lens element, said second lens group comprises a cemented sub-lens group having a positive lens element and a negative lens element, and said third lens group comprises a positive lens element, in this order from the object;

wherein said telephoto lens system satisfies the following conditions:

$$1.0 < f/f1 < 1.4$$

$$1.0 < |f/f2| < 1.6$$

$$|n1 - n2| < 0.1$$

$$0.7 < \{(v1 - v2)/(r2 \times f2)\} \times 1000 < 1.1$$

wherein f designates the focal length of the entire lens system;

f1 designates the focal length of said first lens group;

f2 designates the focal length of said second lens group;

n1 designates the refractive index of said negative lens element of said cemented sub-lens group of said second lens group;

n2 designates the refractive index of said positive lens element of said cemented sub-lens group of said second lens group v1 designates the Abbe number of said negative lens element of said cemented sub-lens group of said second lens group;

v2 designates the Abbe number of said positive lens element of said cemented sub-lens group of said second lens group; and r2 designates the radius of curvature of the cemented surface of said cemented sub-lens group of said second lens group.

* * * * *